May 5, 1959  H. Q. DAY  2,884,870
TRAILER PLACEMENT TRACTOR
Filed June 20, 1956  3 Sheets-Sheet 2

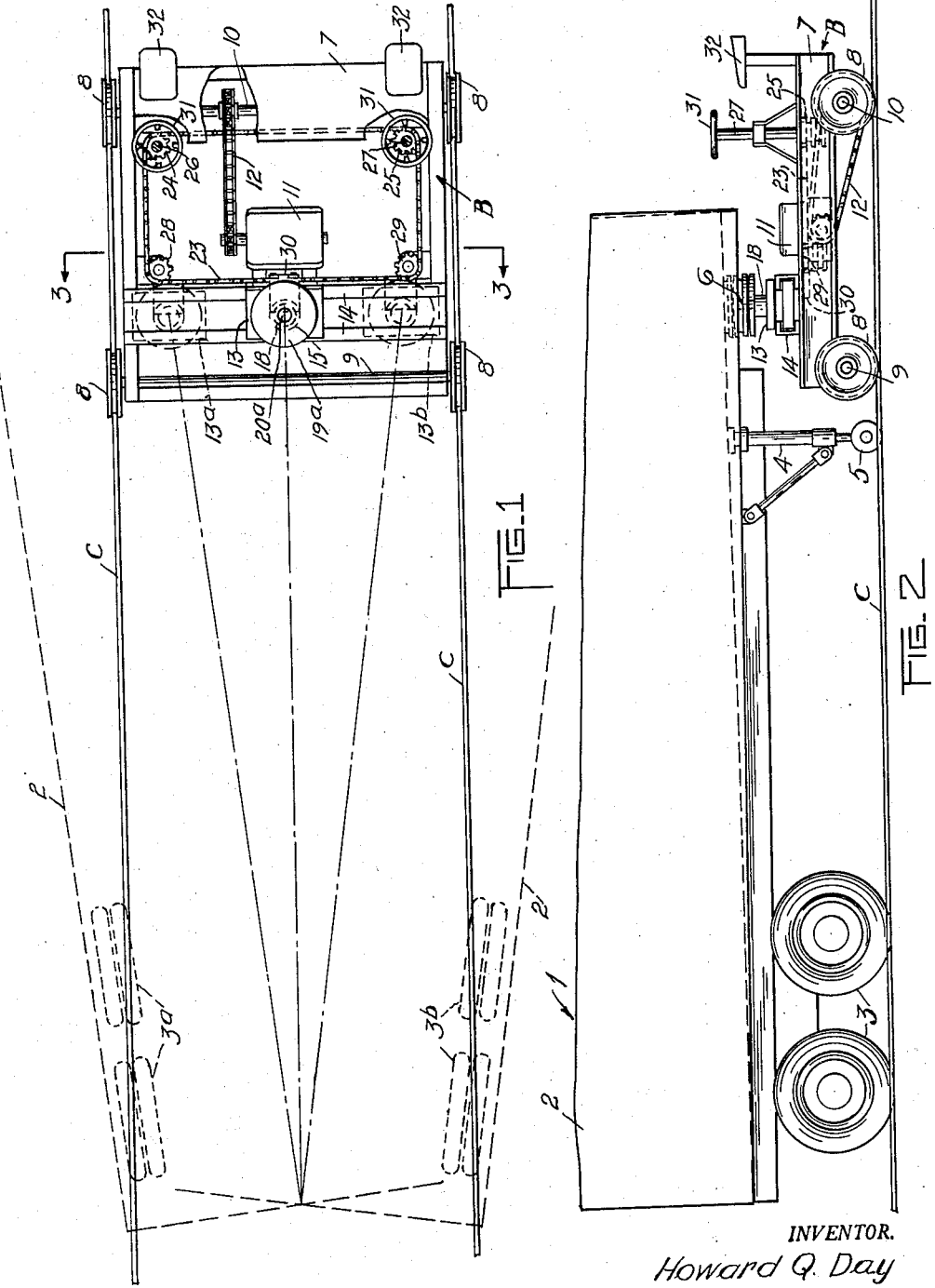

INVENTOR.
Howard Q. Day
BY

May 5, 1959  H. Q. DAY  2,884,870
TRAILER PLACEMENT TRACTOR
Filed June 20, 1956  3 Sheets-Sheet 3
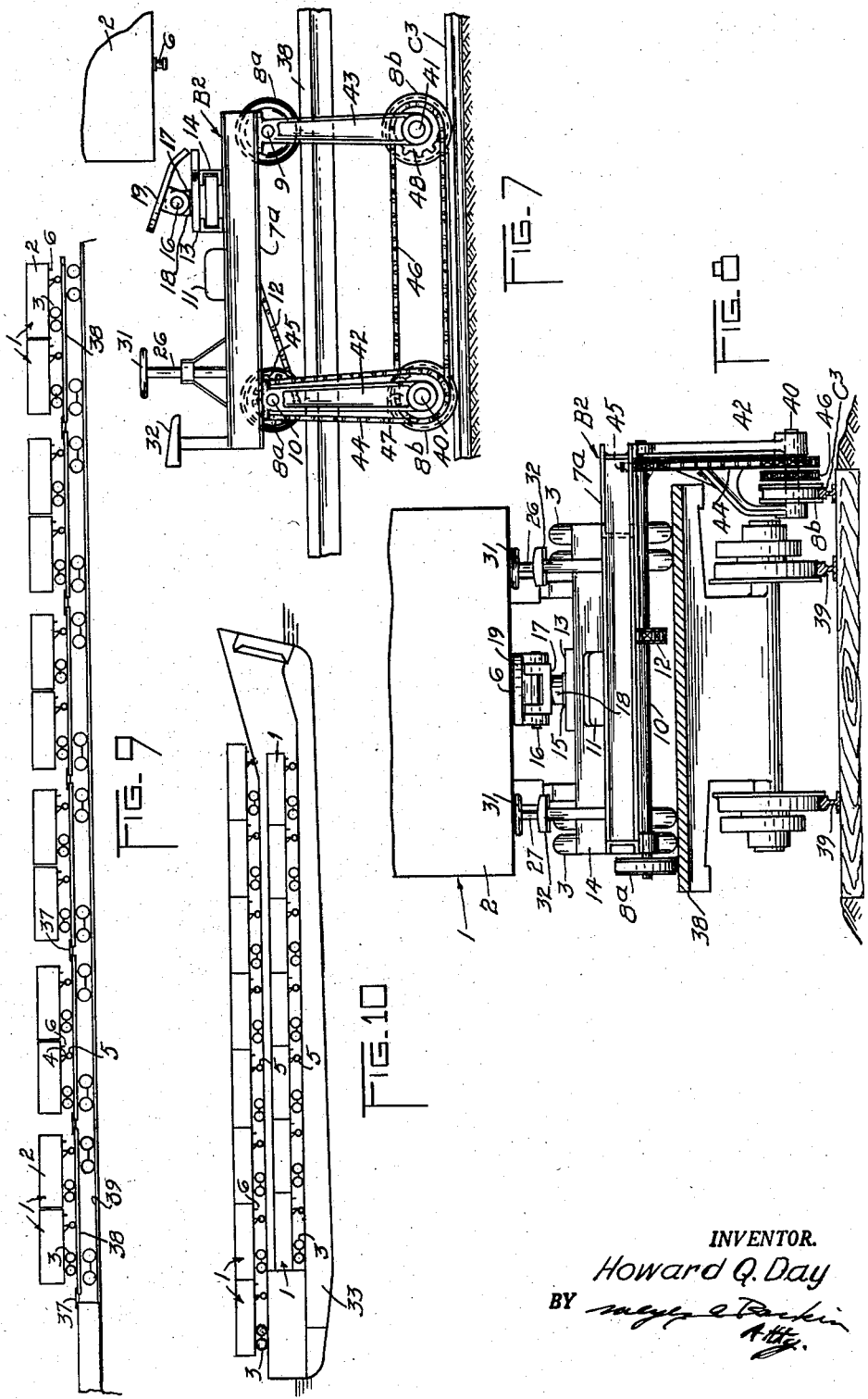
INVENTOR.
Howard Q. Day
BY

United States Patent Office 2,884,870
Patented May 5, 1959

2,884,870
TRAILER PLACEMENT TRACTOR

Howard Q. Day, Miami, Fla.

Application June 20, 1956, Serial No. 592,601

9 Claims. (Cl. 105—27)

The present invention relates to trailer placement by means other than the tractors which haul them on the road, and has more especial reference to a trailer placement tractor comprising a tracked or rail guided vehicle for moving the untracked trailer. The type of trailers referred to are standard highway cargo carriers with loads up to 50,000 pounds. And, by placement is meant moving a trailer, after detachment from its own tractor, to a designated parking or placement area. In one instance this means placing trailers on a string of railroad flat cars, and, in another instance, placing such vehicles in the confines of narrow rows, such as on shipboard or barges where clearance between adjacent rows may be but a few inches on either side.

For economic and other reasons it is now common practice to place these loaded cargo carriers on flat cars, when destined for long distance hauling, and aboard ship when such destination is overseas. This operation, as will be readily understood, imposes many difficulties and is one which it is an object of the instant invention to simplify and expedite.

Placement instrumentalities now employed, and others suggested in the prior art, include tracked motor apparatus for moving tracked vehicles, usually railroad freight cars being shunted in the yards from one track to another, or to a loading platform, or smaller coal and ore carrying cars used in mines. In some instances an untracked vehicle is used to move another untracked vehicle as, for example, the movement of trailers and automobiles by means of wheeled jacks or tractors. In other words, an untracked vehicle is the means for moving another untracked vehicle. In no case do we find a tracked vehicle moving an untracked vehicle.

In practice it is found to be very difficult to place a trailer in a narrow space with an untracked vehicle such as a wheeled jack, and it is practically impossible to place such a trailer when the space is of extended length such as on a long ship or a string of flat cars. In present practice not more than six flat cars can be loaded at a time since if the string gets any longer it is not humanly possible to run the trailer the full length of the train with the ordinary untracked vehicle that is now used.

For water transportation it is found that it takes anywhere from ten to fifteen minutes, and in many instances longer, to place a trailer in a ship using expert tractor operators. With my trailer placer the job can be accomplished in two or three minutes. Since one hundred or more trailers may be placed in a large ship or on a train of flat cars the saving in time and money by avoiding delay of the ship or train is very substantial and the accomplishment of this saving is another object of the invention.

A highway cargo carrying trailer is one unit of a two part trailer truck, the other unit being the tractor. These two vehicles have detachable pivotal connection comprising a pin depending from the body of the trailer adjacent its forward end and the so-called fifth wheel horizontally mounted on the tractor above and in advance of its rear axle. When detached from the tractor the forward end of the trailer is supported by comparatively small all metal ground engaging wheels mounted on a pair of vertically adjustable legs fixed to and depending from the body of the trailer, the load being transferred from the supporting legs to the tractor by adjustment of the legs or by hydraulic means on the tractor. A further object of the invention is to embody this same coupling arrangement between the trailer and trailer placement tractor and thus avoid the necessity of any changes being made in trailers as now constructed.

Another object of the invention is, in its adaptation to the placing of trailers on railroad flat cars, to employ a third rail spiked or otherwise secured to the ties as the guide rail for the trailer placer. The traction wheels on one side of the trailer placer may be rubber tired and run on the surface of the flat cars, while those on the other side are at a lower level and grooved to ride on the third rail. This third rail would normally be at the level of the railroad rails but could be a different level if desired.

A further object of the invention is, at a terminal such as a dock, or on that part of a ship or barge adjacent the dock, to provide a carrier for the placement tractor, this carrier being movable transversely of a plurality of guide rails so that the tractor may readily be shifted from one rail to another.

Still further objects of the invention are the provision of manually controlled means whereby the pivotal connection of trailer and its placement tractor may be shifted laterally for the purpose of steering the trailer, to make this means operable from either side of the tractor, and to position the operator so that he faces the trailer and can guide its movement with an unobstructed view.

To these ends the invention consists of a tracked vehicle for moving an untracked vehicle supported by rear wheels and at its forward end by the tracked vehicle, the tracked vehicle including driving means, a detachable vertical pivotal connection with the untracked vehicle, and manually controlled means for moving such pivotal connection laterally for the purpose of steering the untracked vehicle, all of which will be fully set forth in the following, more detailed, description and particularly defined in the appended claims.

The accompanying drawings illustrating the invention and forming a part of the specification are as follows:

Figure 1 is a plan view of the highway trailer placement tractor with a trailer coupled thereto, the latter being shown in broken lines and illustrating diagrammatically, as will be explained, its movement by the manually controlled steering mechanism.

Figure 2 is a view in side elevation of the two vehicles seen in Figure 1.

Figures 4, 5 and 6 are schematic views illustrating the application of the invention to the placement of trailers on a barge or ship, Figure 4 showing in plan view one arrangement of tractor guide rails, and Figure 6 another arrangement, while Figure 5 is a side view of the ship, dock, tractor and trailer seen in Figure 4.

Figures 7 and 8 illustrate an embodiment of the invention employed in placing trailers on railroad flat cars, Figure 7 showing in side view the tractor, a trailer coupled thereto and a portion of a flat car on which the trailer has been placed, while Figure 8 is an end view from the left with respect to Figure 7.

Figure 9 is a small scale showing in side elevation of a portion of a train of flat cars backed to the platform from which trailers are moved by the tractor onto the cars.

Figure 10 is an illustration in profile of a trailer loaded barge.

In the drawings similar reference numerals refer to similar parts throughout the different views.

Figure 4:
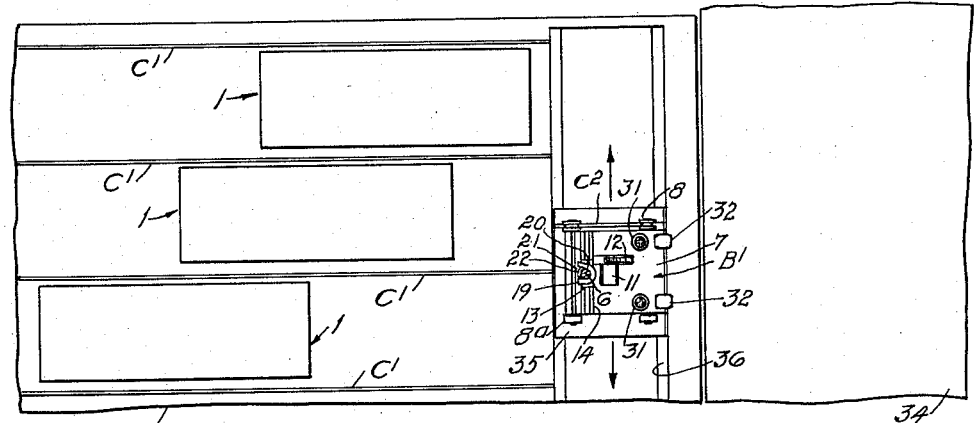

A highway cargo carrying trailer, indicated generally at 1, includes a body 2, the customary multiple rear wheels 3, a pair of vertically adjustable telescopic front supporting legs 4 on which are mounted relatively small ground engaging metal wheels 5, and a fifth wheel coupling pin 6 depending from the body 2.

The trailer placement tractor, as illustrated generally at B in Figures 1 and 2, has a low slung rectangular frame 7. Traction wheels 8 are mounted on front and rear axles 9 and 10, respectively, these wheels having annular grooves as shown, or provided with a flange on one side only according to the shape and size of the rails C on which they run.

The power plant, shown only in outline at 11, has driving connection 12 with the axle 10, the control devices and mechanism of the drive not being shown as the particular type of power plant is immaterial to the instant invention and may, it will be understood, be a gasoline engine, diesel engine or an electric motor either battery or trolley operated, connected to one or both of the axles through suitable clutches, gears, chains or belts.

A transversely movable carriage 13 is slidably supported on guideways provided by cross bars 14 secured to the frame 7. This carriage 13 includes an hydraulic cylinder 15 having the usual fluid inlet and outlet connections leading from a pump operated by the power plant 11, all of which is well known in the art and consequently not shown.

Pivotally mounted at 16, Figures 4 to 8 inclusive, to turn about a horizontal axis on the head 17 of the hydraulically operated piston 18 vertically movable in the cylinder 15 is a plate 19 comprising the aforementioned fifth wheel. This plate 19 has a center hole 20 for receiving the trailer coupling pin 6 which enters the hole 20 through a tapering radial slot 21 in the plate 19 when the tractor is moved into position under the forward end of the trailer. A spring loaded latch 22, Figures 4 and 6, of known construction and operation in this type of coupling functions automatically to releasably lock the plate 19 against disengagement from the pin 6.

In Figures 1 and 2 the fifth wheel is shown as a disc 19a having an axial hole 20a which, when the hydraulic piston 18 is raised, receives the coupling pin 6.

Weight carried by the supporting legs 4 is shifted to the placement tractor by raising the front end of the trailer sufficiently to lift the wheels 5 off the ground. This is accomplished automatically by the hydraulic lift hereinabove described or by manually adjusting the telescopic legs 4 in the customary manner.

Lateral movement of the carriage 13 for the purpose of steering the trailer may be accomplished by such means as a lead screw and nut, a rack and pinion, an hydraulic cylinder, or a system of levers or any combination of the above mounted so as to be controlled by the operator.

Figure 3:
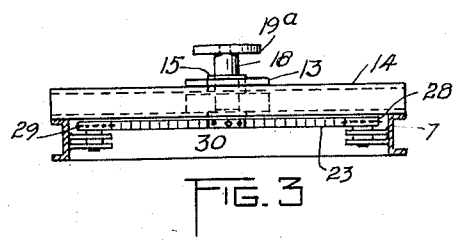
Figure 3 is a sectional detail on line 3—3 of Figure 1, and shows in front elevation the laterally movable carriage and fifth wheel mounted thereon.

In the illustrated embodiment of the invention the means for moving the carriage 13 is an endless chain 23 engaged by sprockets 24 and 25 fixed to operating shafts 26 and 27, respectively, and by idler sprockets 28 and 29, the chain, intermediate such idlers, being secured to the carriage 18 by any suitable fastening devices such as the attaching plate 30 shown in Figure 3. The shafts 26 and 27 are upstanding from opposite sides of the tractor frame 7 and each is provided with a hand wheel 31. Adjacent each wheel 31 is an operator's seat 32. By this arrangement the steering may be done from either side of the tractor, and by facing the trailer the operator has an unobstructed view in steering the trailer along the predetermined path it is to follow.

Figure 5:
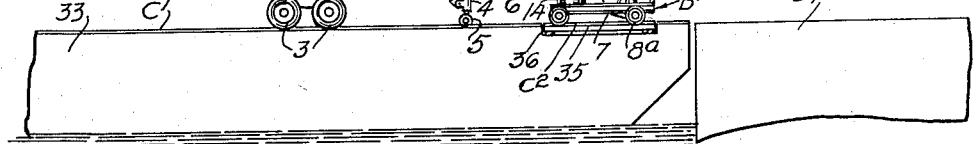
Figure 6:
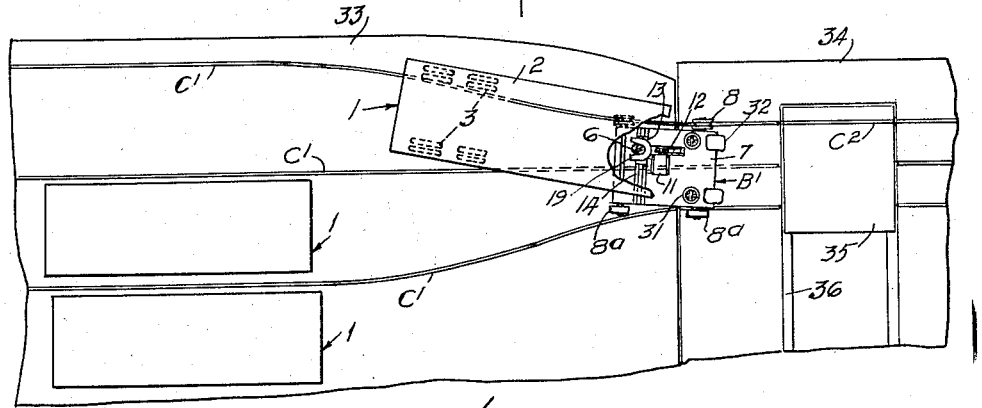

Shown schematically in Figures 4, 5 and 6 is the guide rail arrangement for placing trailers in parallel rows, in this instance the placement being on board a ship or barge. Instead of running on a two rail track, as indicated for the tractor B in Figures 1 and 2, such vehicle shown at $B^1$ is guided by a single rail $C^1$. Consequently the wheels 8 on one side only of the tractor are tracked, the untracked wheels, indicated at 8a, preferably having hard rubber tires. A barge or ship is shown at 33 in a slip against a dock 34, it being understood that the customary ramp, not shown, will be provided and which can be raised and lowered to compensate for the tide. The single guide rail vehicles have the advantage of greater simplicity and economy of construction as compared to the double guide rail.

With the arrangement illustrated in Figure 4 the trailers 1 are coupled to the placement tractor $B^1$ after being moved by other means onto the ship 33. In this instance the single rails $C^1$ are parallel to each other and provision is made for shifting the tractor so that a rail section $C^2$ on which the tractor rides may be brought into alignment with any one of the rails $C^1$ and readily moved from one rail to another. The means provided for this purpose is a carriage 35 for the tractor $B^1$, this carriage 35 being movable in a guideway 36 transversely of the rails, either manually or by suitable power mechanism, not shown, and having the rail section $C^2$ secured thereto.

In Figure 6 the carriage 35 and its guideway 36 are located on the dock 34, the rails $C^1$ being parallel at this point and each terminating at opposite sides of the guideway 36 to permit movement of the carriage 35 and lateral shifting of the tractor $B^1$ from one rail to another. This arrangement provides continuous tractor guide rails from the dock to the ship, there of course being a break in the rails at the ends of the portions thereof carried by the ramp between the dock and ship as hereinabove referred to but not shown.

For placing the trailers 1 on a train of railroad flat cars, a standard type of ramp 37, Figure 9, connects the front and rear ends of adjacent cars 38 and, if desired, but not shown, double tractor guide rails C, as in Figures 1 and 2 may be provided on the cars for a tractor B, or there may be a single rail $C^1$ for a tractor $B^1$, such as shown in Figures 4, 5 and 6. Aligned sections of such rails would extend across the ramps 37.

However, a preferred arrangement is to have a tractor guide rail $C^3$, Figures 7 and 8, at ground level parallel with the rails 39 of the car track. This necessitates a modification of the tractor as shown generally at $B^2$ wherein the traction wheels 8a on one side are similar to the wheels of like number in Figures 4, 5 and 6, while those on the other side, indicated at 8b, are grooved to ride the rail $C^3$. These wheels 8b are mounted on stub shafts 40 and 41 in arms 42 and 43 depending from the frame 7a of tractor $B^2$, the shaft 40 being shown as driven by a chain 44 engaging sprocket wheels 45 and 46 on the drive shaft 10 and stub shaft 40, respectively, another chain 46 connecting like sprocket wheels 47, 47 on the shafts 40 and 41.

Again referring to Figure 1 it will be observed that the steering carriage 13 is shown in its extreme right and left hand positions at 13a and 13b, respectively. When this carriage is at position 13a the trailer wheels 3 will accordingly be as indicated at 3a and as shown at 3b when the carriages is in the position 13b.

Operation of the tractor in placing a trailer is like steering an automobile. The tracked trailer placer runs a true course and the operator by sighting along one side of the trailer keeps it in line with the placement tractor.

From the foregoing it will be observed that broadly stated the invention embodies the placement of an untracked vehicle by a tracked vehicle, that a trailer placement tractor has been provided for accomplishing this operation, that the difficult operation of placing cargo carrying trailers in long rows close to each other has been simplified and made more expeditious, and that the rail guided tractor makes possible the rapid placement of trailers on a long train of flat cars where, by means heretofore provided, the cars had to be limited to not more than six at any one operation.

What I claim is:

1. As a means for moving the trailer of a cargo carrying road vehicle to a predetermined area, a rail guided tractor, power means on said tractor for moving the tractor along its guide rail, and manually controlled means on said tractor for supporting and effecting sidewise movement of the forward end of said trailer during the guided movement of said tractor.

2. As a means for moving the trailer of a cargo carrying road vehicle from a terminal to a predetermined area, the combination of rails leading from the terminal to such area, a wheeled tractor on said rails, a detachable pivotal connection between the forward end of the trailer and said tractor whereby the forward end of the trailer is supported by said tractor, and manually controlled means on said tractor for effecting lateral movement of said pivotal connection so as to steer said trailer along a line adjacent said rails.

3. As a means for moving the trailer of a cargo carrying road vehicle from a terminal to a predetermined area, the combination of a rail leading from the terminal to such area, a tractor, power means for driving said tractor, ground engaging wheels on one side of said tractor and rail engaging wheels on its other side, a detachable pivotal connection between the forward end of said trailer and said tractor whereby the forward end of said trailer is supported by said tractor, and manually controlled means on said tractor for effecting lateral movement of said pivotal connection so as to steer said trailer along a line adjacent said rail.

4. As a means for placing the trailers of cargo carrying road vehicles aboard ship from a terminal adjacent the ship, the combination of a plurality of mono-rails, leading from the terminal to a designated area on a deck of the ship, a tractor, power means on said tractor for driving the tractor, untracked traction wheels on one side of said tractor and rail engaging traction wheels on its other side, the latter riding a selected one of said rails, a detachable pivotal connection between the forward end of the trailer and said tractor whereby the forward end of the trailer is supported by said tractor, and manually controlled means on said tractor for effecting lateral movement of said pivotal connection so as to steer said trailer along a line adjacent the selected tractor guiding rail.

5. The combination with a ship having a deck and rails on said deck defining rows along which cargo carrying road trailers are to be placed, of a trailer placement tractor including traction wheels in engagement with a selected one of said rails, means for driving said traction wheels, means for releasably coupling said tractor to the forward end of a trailer, and manually controlled means for moving said coupling laterally to steer the said trailer to which it is coupled.

6. The combination of a third rail paralleling the two rails of a railroad track, and a motor driven vehicle movable from end to end on a flat car on said track, said vehicle including traction wheels on one side riding on the top surface of said flat car, and traction wheels on its other side engaging said third rail.

7. As a means for moving and steering a cargo carrying highway trailer along the tops of a train of railroad flat cars and over detachable ramps connecting adjacent cars, the combination with a third rail paralleling the two rails of the track on which the flat cars ride, of a tractor including traction wheels on one side riding on the top surface of said cars, traction wheels on the other side of said tractor engaging said third rail, power means for driving said tractor, a detachable pivotal connection between the trailer and said tractor whereby the forward end of the trailer is supported by said tractor, and manually controlled means on said tractor for effecting lateral movement of said pivotal connection.

8. A combination in accordance with claim 7 in which said traction wheels engaging said third rail are annularly grooved wheels.

9. A tracked vehicle for moving a road trailer supported by wheels at its rear end, the said tracked vehicle including driving means and manually controlled means for steering said trailer, the said steering means including means detachably coupled to and supporting the forward end of said road trailer.

References Cited in the file of this patent

UNITED STATES PATENTS

| 512,066 | Spitzer | Jan. 2, 1884 |
| 1,366,292 | Smith | Jan. 18, 1921 |
| 2,043,034 | Dalton | June 2, 1936 |
| 2,043,134 | Wanamaker | June 2, 1936 |
| 2,327,446 | Ortgies | Aug. 24, 1943 |
| 2,361,290 | Herold | Oct. 24, 1944 |
| 2,773,614 | Edwards et al. | Dec. 11, 1956 |

FOREIGN PATENTS

| 822,470 | Germany | Nov. 26, 1951 |
| 431,926 | Italy | Mar. 8, 1948 |